US012311392B2

(12) United States Patent
Fliess et al.

(10) Patent No.: US 12,311,392 B2
(45) Date of Patent: May 27, 2025

(54) VALVE TAPPET ROD

(71) Applicant: VERMES MICRODISPENSING GMBH, Holzkirchen (DE)

(72) Inventors: Mario Fliess, Munich (DE); Stefan Grumbein, Munich (DE)

(73) Assignee: VERMES MICRODISPENSING GMBH, Holzkirchen (DE)

( * ) Notice: Subject to any disclaimer, the term of this patent is extended or adjusted under 35 U.S.C. 154(b) by 166 days.

(21) Appl. No.: 18/041,039

(22) PCT Filed: Aug. 10, 2021

(86) PCT No.: PCT/EP2021/072314
§ 371 (c)(1),
(2) Date: Feb. 8, 2023

(87) PCT Pub. No.: WO2022/038001
PCT Pub. Date: Feb. 24, 2022

(65) Prior Publication Data

US 2023/0285996 A1 Sep. 14, 2023

(30) Foreign Application Priority Data

Aug. 19, 2020 (DE) ..................... 10 2020 121 777.3

(51) Int. Cl.
*B05B 1/30* (2006.01)
*B05C 5/02* (2006.01)

(52) U.S. Cl.
CPC .......... *B05B 1/3046* (2013.01); *B05C 5/0225* (2013.01)

(58) Field of Classification Search
CPC ............................ B05B 1/3046; B05C 5/0225
See application file for complete search history.

(56) References Cited

U.S. PATENT DOCUMENTS 4,066,188 A * 1/1978 Scholl .................. B05C 5/0225 392/484
4,126,272 A 11/1978 Geberth, Jr.
(Continued)

FOREIGN PATENT DOCUMENTS

AT 359 175 B 10/1980
DE 2 260 754 A1 7/1974
(Continued)

OTHER PUBLICATIONS

International Search Report issued in PCT/EP2021/072314; mailed Dec. 10, 2021.

*Primary Examiner* — Bob Zadeh
(74) *Attorney, Agent, or Firm* — Studebaker Brackett PLLC

(57) ABSTRACT

The invention relates to a valve tappet rod (1, 1") for a valve (100, 100") of a metering system (200) for a metering material, wherein the valve tappet rod (1, 1") has an elongate, substantially cylindrical body which is formed at a face-side end (B) with a tappet tip (60), with a tappet head (10) at an opposite head region (A) and, therebetween, from the tappet head (10) to the tappet tip (60), at least with a first guide sleeve portion (20), a narrow portion (30), a second guide sleeve portion (40) and a fluidic portion (50), wherein an outside diameter (30*d*, 30*d*") of the narrow portion (30) is reduced in comparison with the outside diameters (20*d*, 20*d*", 40*d*, 40*d*") of the guide sleeve portions (20, 40). The invention further relates to a valve (100, 100") having such a valve tappet rod (1, 1") and to a metering system (200) having such a valve (100, 100") or such a valve tappet rod (1, 1").

19 Claims, 6 Drawing Sheets

(56) References Cited

U.S. PATENT DOCUMENTS

Figure 1:
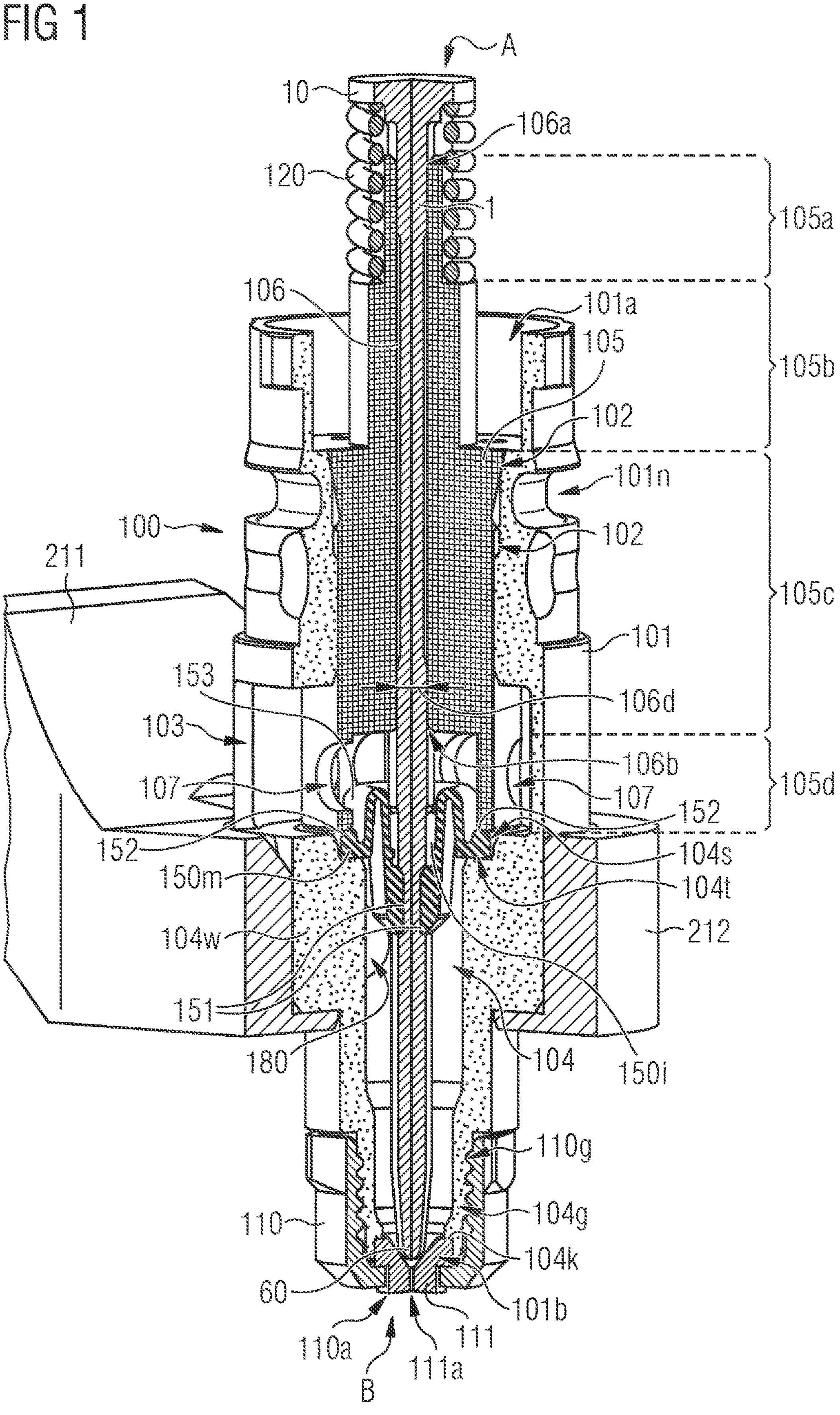

| | | | | |
|---|---|---|---|---|
| 4,678,100 | A * | 7/1987 | Gelinas | B05C 11/00 92/65 |
| 4,907,741 | A * | 3/1990 | McIntyre | B05B 1/3093 239/416 |
| 5,074,443 | A * | 12/1991 | Fujii | B05C 5/0225 222/639 |
| 5,181,636 | A | 1/1993 | Anderson et al. | |
| 5,788,128 | A * | 8/1998 | Hickey | B65C 9/2221 222/504 |
| 7,143,965 | B2 | 12/2006 | Lindner et al. | |
| 9,126,223 | B2 * | 9/2015 | Lanier | B05C 5/0225 |
| 9,415,415 | B1 * | 8/2016 | Jones | B05C 11/1039 |
| 11,385,088 | B2 | 7/2022 | Fliess | |
| 2004/0079818 | A1 | 4/2004 | Lindner et al. | |
| 2006/0057286 | A1 * | 3/2006 | Gibbons | H01M 50/184 156/90 |
| 2006/0131348 | A1 * | 6/2006 | Gould | B05C 5/0237 222/504 |
| 2014/0291358 | A1 * | 10/2014 | Fliess | G01F 11/021 222/504 |
| 2016/0102639 | A1 * | 4/2016 | Filippi | F16K 31/0655 251/336 |
| 2021/0018353 | A1 | 1/2021 | Fliess | |

FOREIGN PATENT DOCUMENTS

| | | | |
|---|---|---|---|
| DE | 691 12 789 | T2 | 2/1996 |
| DE | 101 33 166 | A1 | 1/2003 |
| DE | 10 2017 122 034 | A1 | 3/2019 |
| WO | 2017/194625 | A1 | 11/2017 |

* cited by examiner

VALVE TAPPET ROD

The invention relates to a valve tappet rod for a valve of a metering system, a valve having such a valve tappet rod and a metering system having such a valve or respectively such a valve tappet rod.

A (micro) metering system for the exactly metered delivery of a liquid or viscous metering material with an actuator unit, which drives a valve tappet rod of a valve of the type mentioned in the introduction is known for example from DE 10 2017 122 034 A1. Thereby also very small quantities of the metering material can be brought precisely to a target surface of a workpiece, without the metering system itself coming in contact with the target surface. The valve tappet rod here is an elongate body, quite thin in relation to length, which is guided movably in longitudinal direction in a suitable counter-piece, here e.g. a sleeve or respectively guide sleeve, of the valve. By means of the valve tappet rod, a desired, exactly metered quantity of a metering medium or respectively metering material can be pressed out or respectively ejected in a controlled manner from a nozzle chamber or respectively valve chamber, i.e. a reservoir, through an opening of the nozzle chamber.

The valve tappet rod is guided here over a very large distance in the sleeve of the valve, whereby friction and wear occur. In order to achieve as long a durability of the parts as possible, the latter, as is usual for such bearings or respectively guides, are lubricated by means of a particular oil or grease. This indeed has a positive effect on the wear of the valve tappet rod and the guide sleeve. The use of a particular lubricant can, however, also increase the damping of the system and therefore has an influence on the force and speed at which the valve tappet rod can be moved within the guide sleeve.

It is therefore an object of the present invention to indicate an improved valve tappet rod and a corresponding valve or respectively metering system which are more wear-resistant and present less damping during a movement.

This problem is solved by a valve tappet rod according to Claim 1, a valve according to Claim 9 and a metering system according to Claim 12.

The valve tappet rod according to the invention for a valve of a metering system for a metering material comprises, as hitherto, an elongate, substantially cylindrical body. Such a body is to be understood as an object similar to a rod, preferably rotationally symmetrical in longitudinal direction, which on the one hand is longer than it is wide (thick) and on the other hand preferably consists of solid material, i.e. is not hollow in the interior.

Alternatively, however, it would also be conceivable to configure the body of the valve tappet rod to be hollow in the interior, to save weight, e.g. to manufacture it in two parts from an elongate sleeve with a welded-on, wearing tappet tip, or from at least two materials which are joined by a suitable method.

In the following, the valve tappet rod is also abbreviated synonymously by "tappet" for the sake of simplicity.

At a face-side end in longitudinal direction of this body, the tappet is configured with a tappet tip. Contrary to the meaning possibly suggested by the selected term, however, the term does not necessarily refer to a pointed characteristic of such a tappet tip, but rather defines simply only the foremost (i.e. discharge-side or respectively ejection-side) part of the body of the tappet. The tappet tip therefore describes a front surface or respectively shape of the body which e.g. can also be slightly rounded, provided with a sphere, flattened or with a spherical or paraboloidal indentation. It serves generally (in a similar manner as this is also the case with a conventional spice pestle) to displace material, such as e.g. a metering material, i.e. for example to press it away, as will become still clearer further below. This means that the tappet tip comes in contact with metering material and serves for the actual delivery or respectively ejecting thereof.

At an opposite head region of the said body, spaced apart in longitudinal direction therefrom, the tappet is formed with a tappet head. A head region is not inevitably to be understood as the actual end of the body. It can also concern a type of "flange" in an end region of the body, when the end region does not directly define the end. The tappet head serves as an effective area for an actuating element, such as e.g. an actuator unit, as is explained additionally, further below.

The function and role of the tappet tip and of the tappet head of the tappet will emerge more clearly further below in connection with a valve according to the invention and with a metering system, for which the valve tappet rod is formed as a component or replacement part.

As just mentioned, the tappet head is spaced apart from the tappet tip of the tappet. For this, according to the invention the following portions adjoin one another along the body (from tappet head to tappet tip):

Firstly a first guide sleeve portion preferably adjoins the tappet head in an adjacent manner. This guide sleeve portion is formed with an outside diameter which allows it to be introduced exactly into an associated tappet centring screw or respectively guide sleeve during an assembly of a valve. Such a guide sleeve, which is used in a valve for the straight and centred guiding of the valve tappet rod, comprises for this for example at least one continuous bore with a preferably uniform inside diameter for the tappet. So that the tappet can not slide completely through the guide sleeve, at least an outside diameter of the tappet head is greater than the inside diameter of the guide sleeve, so that the tappet, on introducing into the guide sleeve, abuts at the latest with the tappet head on the guide sleeve, but in particular already indirectly with a restoring element mounted between tappet head and guide sleeve.

Adjoining the first guide sleeve portion is a narrow portion. Adjoining the latter, in turn, is a second guide sleeve portion, so that the narrow portion is surrounded by the two guide sleeve portions.

As the name already implies, the cross-section of the narrow portion is reduced or narrowed in relation to the portions adjoining it. The narrow portion has here an outside diameter which is smaller or respectively reduced compared to the outside diameters of the first and second guide sleeve portion. In other words, a cross-section or respectively a cross-section area through the body of the tappet is smaller in the region of the narrow portion than in the adjoining regions of the guide sleeve portions.

Further towards the tappet tip, a fluidic portion adjoins the second guide sleeve portion (at the opposite end of the narrow portion). The fluidic portion itself adjoins in turn the tappet tip. In a preferred variant of the tappet, a tappet tip portion can be integrated here therebetween, i.e. between tappet tip and fluidic portion, as is explained in addition further below. The fluidic portion means a portion along the body of the tappet which in operation of the tappet in a valve of a metering system is in contact with the metering material which is to be metered or respectively ejected. The structure of a valve and of a metering system is likewise explained in more detail further below.

A valve according to the invention for a metering system comprises a valve tappet rod according to the invention.

As is usual for a valve, it also comprises here preferably at least one substantially sleeve-shaped or respectively hollow-cylinder-shaped valve body, preferably tapering conically as a whole to a face side, which valve body surrounds or respectively borders a guide sleeve, preferably all around along its outer surface.

The valve tappet rod is guided movably in this guide sleeve in the valve body, i.e. the guide sleeve forms the bearing for the valve tappet rod in the valve body. In an operation as intended, according to the invention at least the guide sleeve portions remain partly, and the narrow portion of the valve tappet rod entirely, in this guide sleeve.

In order to be able to introduce the guide sleeve into the valve body during installation, preferably at least one cover surface of the valve body can have a corresponding opening. After the introducing, the guide sleeve (with introduced valve tappet rod, pushed-on restoring element and pushed-on sealing element) can be screwed, clamped, clicked and/or engaged from above into the valve body so that the valve body is closed upward. On the base surface, lying opposite the cover surface, there is a further opening in the valve body, to which the valve body tapers as a whole slightly conically, as mentioned. This opening is the metering opening or respectively nozzle opening of the valve or respectively mounted in here with nozzle with nozzle opening, through which, in operation as intended, the metering material is ejected. In simplified terms, the nozzle opening can be opened or closed here by means of the tappet. This means that the tappet serves here as closure element of the valve or respectively of the nozzle of the valve. More precisely, the nozzle opening can be opened or closed with the tappet, above all by means of the tappet tip or respectively of a tappet tip portion adjoining thereto, which is pressed into a valve seat or respectively sealing seat of the valve or respectively of the nozzle and which is movably mounted with respect to this nozzle opening. The valve body therefore forms both a type of "fitting" for the guide sleeve and also a closable interior space, into which the metering material can be directed for metering.

So that the tappet returns back into the starting state or respectively the starting position again after an ejection movement, the valve can optionally additionally comprise a restoring element, such as e.g. a spring element or similar, which in the assembled state of the valve is mounted between the above-mentioned tappet head of the valve tappet rod and a stop of the guide sleeve.

The valve further comprises a nozzle chamber or respectively valve chamber, which corresponds to the interior already mentioned above. The valve chamber defines the lower region on the side of the valve body facing away from the optional restoring element. Preferably, a feed channel or respectively a feed opening can be formed in a wall of the valve chamber, so that the metering material can be directed into the valve chamber. The valve chamber then contains, in operation, the metering material for the metering system, which is fed via a supply line of the metering system via the feed channel of the valve into the valve chamber, so that the metering material can be ejected by means of the tappet in turn out from the valve chamber or respectively nozzle chamber in an exactly metered manner.

According to the invention, the valve furthermore comprises a sealing element for sealing between the guide sleeve, in particular of a hollow-cylindrical region of the guide sleeve, and the valve chamber of the valve body, in which valve chamber the metering material is situated at least for the operation. This means that it seals off a (fluidic) region which, as intended, comes in contact with the metering material, with respect to a remaining region the valve.

Such a substantially annular sealing element comprises preferably centrally an opening for the tappet, with an inside diameter which provides for a tight seal against the tappet. In the assembled state of the valve as intended, in a metering system, the sealing element is preferably arranged so that it lies on a face side of the guide sleeve within the valve body against the guide sleeve, and is squeezed in here in a sealing manner between an edge of the hollow-cylindrical valve chamber of the valve body and an edge of the guide sleeve. Thus is also seals radially outwards. It is thereby prevented—at least as long as the sealing element is intact—that metering material arrives out from the valve chamber into a hollow-cylindrical region (explanation further below) of the guide sleeve and possibly between tappet and guide sleeve. Further preferred solutions for prevention against this problem are explained further below.

A metering system according to the invention comprises a valve according to the invention with a valve tappet rod according to the invention. In addition, the metering system can comprise a supply line to a feed channel of the valve for feeding metering material into the 30 valve chamber or respectively nozzle chamber, and optionally a metering material storage holder (for a metering material container, such as e.g. a cartridge, bottle or suchlike). The supply line connects the metering material container (preferably inserted into the metering material storage holder) with the feed channel here, which opens out through a wall of the valve in the valve chamber.

Alternatively to the metering material storage holder, the metering system can also be connected to a tank or respectively container from which the metering material is pumped or respectively directed via the feed channel continuously into the valve chamber. For this, the container can be connected via a supply line to the feed channel or respectively fluidic channel of the valve. The metering material in the metering material container, which is preferably held by means of the metering material storage holder, can be acted upon by pressure so that the metering material arrives via the feed channel inter alia into the valve chamber. Preferably, the metering material container can also, however, first be acted upon by pressure for the operation, e.g. by means of a pump (or similar) of the metering material storage holder. Equally, it is possible that the metering material, especially when it is very liquid, flows by itself or respectively due to gravity into the valve chamber.

As usual, a metering system further comprises an actuator unit for actuating or respectively accelerating the valve tappet rod, which actuator unit exerts or respectively generates directly or indirectly a stroke onto the tappet head. The actuator unit can transfer or respectively exert a desired, chronologically limited impulse onto the tappet head of the tappet for example by means of a lever, actuator or suchlike. Likewise however, the actuator unit, with corresponding arrangement or respectively embodiment, can also exert an impulse or traction onto the tappet, which in turn returns the tappet.

Through the diameter reduction according to the invention in the narrow portion between the two guide sleeve portions, it can be achieved that the damping between the valve tappet rod and the associated surrounding guide sleeve is reduced or respectively decreased on a relative movement of the valve tappet rod relative to the guide sleeve.

Furthermore, the narrow portion of the valve tappet rod can advantageously be used to form a lubricant reservoir which permanently lubricates the valve tappet rod or respectively the tappet sufficiently in operation with an ejection and retraction movement as intended, so that the material abrasion and wear are kept as low as possible. For this, before installation, a thin film of lubricant could be applied onto the narrow portion.

Additionally or alternatively, the narrow portion can be used to receive abrasion or respectively material abrasion from the movement of the tappet, so that the tappet or respectively the valve or respectively the metering system remain functional for longer.

Through the fact that the narrow portion is formed on the tappet, the guide sleeve itself can advantageously be largely smooth or respectively simple, i.e. without a groove introduced in the bore, depression or suchlike. This considerably facilitates that the guide sleeve, as preferred can be formed at least partially with a hard material, such as e.g. hard metal, preferably of metal matrix composite materials with hard material particles. Further hard materials are additionally named later. In practice, it has been found that it is extremely laborious and costly to configure the inner bore larger in the course in the middle with a hard material guide sleeve, in particular hard meal guide sleeve, than in the start and end region of the inner bore.

Further, particularly advantageous configurations and further developments of the invention will emerge from the dependent claims and from the following description, wherein the independent claims of a claim category can also be further developed in an analogous manner to the dependent claims of another claim category and in particular also individual features of different embodiment examples can be combined to new embodiment examples.

On installation of the valve for the operation as intended, the valve tappet rod is installed e.g. in a valve with a valve body with a valve chamber with two openings. Here, it runs through an opening on the tappet head side into the valve chamber and projects (at a distance of a provided stroke length) up to the opposite nozzle opening of the valve chamber, so that the latter is closed in the disengaged closed position of the tappet with complete deflection (i.e. maximum stroke length) of the tappet. In the opening of the valve chamber on the tappet head side, the fluidic portion of the tappet is situated here with the pushed-on or respectively placed-over annular sealing element, so that this element is permanently tightly closed. At the same time, the tappet or at least the tappet tip sits in this starting position on the opposite side at a distance of a maximum stroke length in the valve seat or respectively sealing seat of the nozzle (or respectively an outlet opening of a nozzle insert for the nozzle), in order to close the nozzle opening there in the disengaged closed position of the tappet, and hence to limit a metering quantity.

Depending on use, the valve chamber is filled with a corresponding (suitable) metering material (via the feed channel in the valve chamber), which can be directed for this out from the metering material container into the valve chamber of the metering system and acted upon by a pressure, or respectively can be already present in the metering material container in a state which is acted upon by pressure. Possible metering materials which are to be used are, for example, adhesives, solder pastes or respectively soldering pastes, water, oil, paints, lacquers and suchlike.

Metering material can then be pressed out or respectively ejected in a desired, exactly meterable quantity onto a workpiece from the valve chamber by means of the tappet in combination with the appropriate nozzle (or respectively by means of a nozzle insert for the nozzle). For the metered delivery of the metering material, e.g. the above-mentioned actuator unit of the metering system generates respectively a desired stroke or respectively impulse, which is transferred as an ejection movement via the tappet heat directly rigidly into the tappet tip of the tappet, in order to yield or respectively eject there the metering material (in operation surrounding the fluidic portion, the tappet tip portion and the tappet tip). Depending on the desired delivery of the metering material, the valve tappet rod is then moved to and fro for a desired period of time, with a desired frequency on each stroke from the said starting position, i.e. at least partially in or respectively out from the nozzle or respectively the sealing seat. For example, the tappet could also be ejected only half the maximum stroke length, in order to only reduce the metering quantity between two strokes, but not to stop it completely.

Here, depending on the viscosity of the metering material, the valve can be moved in a so-called open operation, in which the tappet tip is not moved into the valve seat between two strokes, therefore the valve is not closed. This is possible in the case of viscous materials. The ejection of metering material then takes place only through the forwards movement of the valve tappet rod when the latter is moved in the direction of the valve seat (so-called "jetting"), and not through the pressure of the metering material in the valve chamber. In the case of media which are more runny, an operation is of course also possible, in which the valve is always respectively closed between two metering processes, e.g. by means of the above-mentioned restoring element. Also in the case of the open operation—otherwise preferred here—however, the valve can be closed, e.g. when metering is not to be carried out for a longer period of time.

There are various possibilities for the configuration of the individual portions of the valve tappet rod:

The outside diameters of the respective guide sleeve portions of the tappet can be selected at a maximum to be so great than they can fill the inside diameter, associated with them, of the guide sleeve exactly in a precise fit without excess play. The guide sleeve can therefore have a borehole inside diameter which is minimally greater than the outside diameter of the tappet in the guide sleeve portions. Examples of such a fit could be e.g. approximately H7/f7 or H7/g6 (in accordance with DIN 7157). The tappet can thus be guided in an exactly centred manner in the openings of the guide sleeve.

Preferably, a length and a position of the narrow portion along the tappet can be selected so that the narrow portion on an ejection—and retraction movement with a defined stroke as intended—which can depend on the deflection or respectively the operation of the actuator unit—in operation of the tappet moves only within the associated guide sleeve. In other words, the tappet can be formed so that the guide sleeve portions on an ejection—and retraction movement of the tappet as intended relative to the guide sleeve in operation always remain at least partially in the guide sleeve.

Thereby, it is achieved that the face-side openings of the guide sleeve are always filled and as far as possible no metering material can penetrate therein (if e.g. the sealing element were to be defective). In other words, the access to the narrow portion of the tappet is therefore permanently blocked by the second guide sleeve portion situated therein—at least partially in relation to its longitudinal extent.

Basically, the guide sleeve portions of the valve tappet can be configured with a different outside diameter. Preferably, the outside diameters of the guide sleeve portions of the valve tappet rod can, however, be of equal size, in particular when the borehole inside diameter of the guide sleeve is continuously of equal size.

The outside diameter of the narrow portion can preferably also be of equal side as the outside diameter of the fluidic portion.

Preferably, the length of a respective guide sleeve portion of the tappet can amount to at least a provided stroke length of a maximum oscillation amplitude or respectively of a maximum stroke, i.e. a maximum ejection or respectively maximum rebound of the tappet (i.e. an intended maximum target stroke length in operation as intended). If namely a respective guide sleeve portion corresponds in terms of length at least to a stroke length, a part of the respective guide sleeve portion always remains within the associated guide sleeve on such a movement, so that no metering material can arrive into the guide sleeve.

Alternatively or additionally, the narrow portion of the tappet can be at least two such maximum stroke lengths shorter than the total length of the associated guide sleeve. Thereby, the same aim can be achieved when the narrow portion is situated in the middle of the guide sleeve portions.

Preferably, a maximum target stroke length of the stroke of the actuator unit can amount to at least 0.25 mm, particularly preferably 0.5 mm and most particularly preferably 1 mm.

When the actuator unit only acts in one direction, therefore e.g. strikes onto the tappet head, optionally—as already mentioned—a restoring element can be inserted between tappet head and guide sleeve, in order to bring the valve tappet rod into the starting state again after an ejection movement by the stroke of the actuator unit. A restoring element, which presents itself particularly for this, is a coiled torsion spring, such as for example a helical coil spring. This consists e.g. of a wire wound in helical shape and is distinguished in that is available in any desired variants and is usually particularly economical. Through its helical or respectively substantial hollow-cylindrical shape, it can be pushed at least partially onto the valve tappet rod with corresponding choice of the inside diameter.

In order to achieve that the coil spring is able to be pushed onto the valve tappet rod only (starting from the tappet tip) up to the tappet head, the tappet head can preferably be configured as follows. For example, it can comprise an actuating flange e.g. for an actuator unit of a metering system as a stop and/or guide for the coil spring, for the elastic, preferably sprung, bearing of the valve tappet rod relative to the associated guide sleeve. Such an actuating flange is to be understood to be a flange or respectively projecting portion or else an endpiece or respectively terminating tappet plate, which is formed so that the actuator unit can act thereon accordingly by a lever or respectively actuator suitable for this, and hence generates the stroke already described above, in order to be able to move the valve tappet rod as intended. Preferably, an actuator unit can be used for this, as is described in DE 2017 122 034 A1.

For a centred guidance of the coil spring, the tappet head can preferably also have a guide ledge in addition to the actuating flange, which guide ledge can be arranged for example between the actuating flange and the first guide sleeve portion. The guide ledge can also be configured in a flange-like manner here. However, it can also be realized simply as a type of "step" or respectively ledge.

This "step" or respectively the ledge can be abrupt or respectively right-angled, relative to the actuating flange or respectively to the first guide sleeve portion.

Preferably, the transitions from the guide ledge to the adjoining portions can be configured in a fillet-shaped manner, i.e. the respective outside diameter continues via a short fillet, enlarging or reducing the radius in an "arc-shaped" manner into the larger or respectively smaller outside diameter. In this way, the transitions can be produced in a cutting method, therefore for example milled, turned or ground, as the lathe or respectively the milling machine can then operate further rapidly and continuously between two different radii, without have to discontinue in between.

Particularly preferably here an outside diameter of the guide ledge can be greater than the outside diameter of the first guide sleeve portion. This is particularly advantageous when for example a coil spring with an inside diameter is selected, which is distinctly greater than the outside diameter of the guide sleeve portions, so that the coil spring would then be mounted with relatively large play (i.e. loosely, as friction-free as possible) with respect to the guide sleeve portion.

Most particularly preferably, an outside diameter of the actuating flange, in turn, can be greater than the outside diameter of the adjoining guide ledge.

As already mentioned above, it is thus therefore achieved that—under the condition that a correspondingly selected coil spring (which is able to be pushed from a direction of the tappet tip onto the guide ledge and abuts against the actuating flange) is used—the coil spring is guided in a centred manner on the guide ledge. Furthermore, the coil spring is held by the actuating flange for the actuator unit on the end side towards the head region on the tappet, in order to thus achieve a desired rebound—or also retraction movement of the valve tappet rod against the spring force of the coil spring.

There are also different possibilities for the other transitions between the further portions.

Preferably, a ledge can be configured more steeply between the first guide sleeve portion and the narrow portion than a transition between the narrow portion and the second guide sleeve portion. This, on the one hand, brings advantages with regard to manufacturing technique, as the valve tappet rod during manufacture (for example in a direction from the tappet tip to the tappet head) can be milled, turned, and/or ground in a continuous manufacturing step without in the meantime having to be released and clamped in or respectively securely clamped again in the reverse orientation for the corresponding method. On the other hand, it is hereby achieved that in operation, material abrasion of the tappet and of the associated guide sleeve can collect in this portion, without the quality of the metering result of the metering system decreasing for a longer period of time. Furthermore, the narrow portion can be used as a lubricant reservoir from which lubricant comes out more easily in a direction of the second guide sleeve portion than in a direction of the first guide sleeve portion, as a steeper ledge is present there.

Tests have shown that the components of the metering system consequently have to be dismantled more rarely for cleaning purposes than is the case without the described narrow portion, preferably with such transitions to the adjoining portions, which in turn brings technical production and economic advantages.

If—as is the case in a particularly preferred variant—the two guide sleeve portions have the same outside diameter, accordingly the steeper ledge between the first guide sleeve portion and the narrow portion can, at the same time, also be shorter than the transition between the narrow portion and the second guide sleeve portion.

Particularly preferably, the fluidic portion has an outside diameter which is smaller than the outside diameter of the second guide sleeve portion. For example, a passage between these two portions could decrease continuously, in stages or abruptly.

Preferably, a ledge can be formed between the second guide sleeve portion and the fluidic portion in a "shoulder-like" manner. This shoulder can then serve to position the already above-mentioned sealing element at the shoulder on the tappet, which then is also held in this position along the tappet during the ejection—or respectively rebound movement of the tappet as intended in operation. On assembly of the sealing element on the tappet, this shoulder therefore serves as a type of "stop" or "positioning aid", when the sealing element is placed from the tappet tip onto the tappet.

Particularly preferably, the ledge can be configured with a fillet which has a fillet radius of at least 0.01 mm, particularly preferably at least 0.1 mm, most particularly preferably at least 0.25 mm, and/or a fillet radius of preferably a maximum of 2 mm, particularly preferably a maximum of 1 mm and most particularly preferably a maximum of 0.5 mm.

In order to additionally secure the sealing element so that it does not shift along the tappet, a fixed annular inner sleeve can be additionally integrated into the sealing element, which inner sleeve has an annular groove or alternatively an annular tongue, by which it can engage into a corresponding tongue or alternatively a groove of the sealing element, so that the inner sleeve is securely anchored in the sealing element. Here, in the finished mounted state, the inner sleeve can be arranged on the inner side in the sealing element, e.g. with the meander-shaped membrane seal, described further below, above a sealing point of the sealing element on the tappet, so that the shoulder-like ledge which has just been mentioned can strike thereon. Thereby, the membrane seal can be reinforced as a whole, whereby in turn the membrane seal can be held in a more stable and more secure manner in the desired position on the tappet.

Preferably, the opening or respectively bore of the sealing element (through which the tappet runs in the installed state) can be manufactured with undersize relative to the associated outside diameter of the tappet, i.e. it can thus sit particularly tightly against the radially inner annular first sealing point on the tappet, and hence can also remain at the desired position during a movement of the tappet. In total it can thus be achieved that the tappet and membrane seal are not only secured with respect to one another against slipping in the placed-on or respectively pushed-on state as intended, but also are connected to one another in a force-fitting manner, i.e. consequently particularly tightly.

In the simplest case, the sealing element can be a ring seal in the form of a conventional O-seal.

As already mentioned, the sealing element can preferably be a membrane seal. Such a membrane seal, as a different type of ring seal, comprises centrally an opening through which the tappet then runs in operation. This opening can then be manufactured with undersize relative to the associated outside diameter, so that it sits particularly tightly against the tappet and therefore remains at the desired position during a movement of the tappet.

The membrane seal can have here an elastic transition region or respectively an elastic, flexible membrane between the first sealing point around the tappet and a radially outer annular second sealing point between guide sleeve and valve chamber. The first sealing point defines here the circular inner edge of the opening in the centre of the membrane seal which, in operation, lies directly—or indirectly via a corresponding inner sleeve in the fillet described above—against the valve tappet rod. The second sealing point means here a radially outer annular sealing portion, therefore an annular contact surface between guide sleeve and valve chamber of the valve, at which the membrane seal seals around the inlet opening of the valve tappet rod into the valve chamber.

In a particularly preferred variant, the membrane seal can be configured in a meandering shape, i.e. with a meander-shaped membrane which runs in cross-section from the central opening towards the outer edge in an undulating or respectively meander-shaped manner. On an ejection—or respectively retraction movement of the tappet as intended, in which then the radially inner, first sealing point moves fixedly with the tappet against the radially outer, second (positionally fixed) sealing point between guide sleeve and valve chamber, the meander-shaped membrane can be easily unfolded, without the material itself being extended or respectively stressed. This membrane seal thus remains above all also tight against the sealing points, because neither the first nor the second sealing point are moved or respectively stressed during the movement. The meander-shaped configuration of the membrane seal has the advantage that greater stroke lengths are thus also able to be realized.

In an alternative preferred variant, the membrane seal can rather be configured running flat, i.e. substantially rectilinearly in cross-section from the radially inner opening to the radially outer edge. The advantage of this embodiment lies in that the manufacture is distinctly simpler, saving more with regard to material and hence also more economical.

Particularly preferably, the sealing element can, however, also be embodied as a sliding seal. Here, in the initial state, the seal can for example also be substantially flat. Furthermore, it can equally be formed with a central opening or respectively bore, embodied with an undersize with respect to the valve tappet rod, for guiding the valve tappet rod through. A radially outer sealing point of the sliding seal can remain positionally fixed here. By comparison, a radially inner sealing point can slide along on the central bore, manufactured with undersize, of the sliding seal on a movement of the valve tappet rod along the latter and can seal there by a close fit with undersize.

Optionally, the sliding seal can additionally have a spring element which still further increases the prestressing force by which the sealing element is pressed against the valve tappet rod, so that the sealing capability is thus further improved. The sliding seal can be arranged here on the valve tappet rod, and the corresponding fillet can be configured in the direction towards the tappet head, such that on a movement of the valve tappet rod no contact is brought about between the fillet and the seal which is sliding because it is rigid.

The guide sleeve can preferably surround the hollow-cylindrical region already mentioned above, which extends on a face side of the guide sleeve on the tappet tip side beyond a thread region of the guide sleeve and thus forms a type of "pre-chamber" around the opening of the bore of the guide sleeve on the tappet tip side. Centrally within this hollow-cylindrical region during operation the tappet moves here to and fro with the radially inner first sealing point of the sealing element. Here, also during the ejection movement or respectively retraction movement of the tappet as intended, a part of the second guide sleeve portion (at least partly in the disengaged state of the valve tappet rod) and/or a part of the fluidic portion of the tappet always remains in the thread region of the guide sleeve.

For the case where the sealing element fails or respectively becomes leaky, the hollow-cylindrical region or respectively the pre-chamber of the guide sleeve can preferably be formed in its outer surface with at least one drainage bore, so that a metering material-possibly exiting from the valve chamber through the seal into the pre-chamber—can be directed away via the drainage bore before it could be pressed or respectively pushed into an intermediate space between tappet and guide sleeve owing the pressure by trailing metering material (in the case of a completely filled pre-chamber). Therefore, the pre-chamber can not fill up in the case of a seal leak. Rather, the metering material can run or respectively trickle out from the drainage bore preferably into a collecting region, e.g. a collecting basin or suchlike of the valve body, designed specifically for this. This can signal to the user of the metering system (if applicable with the formation of open viewing windows e.g. with a free view onto the collecting basin in a wall of the valve body at the height of the hollow-cylindrical region of the guide sleeve in the region of the drainage bores), that the sealing element is damaged and should be exchanged. If required, for example also cameras or optical sensors or such like can be used for this in a supporting manner for the user. The drainage bores can therefore serve as an indicator for the user, in order to establish a sealing failure (as quickly as possible) promptly without damage to the workpiece and to be able to remedy it in a material- and cost-saving manner.

In conventional metering systems, there is generally no possibility for this. Sensors or respectively measuring equipment installed in this respect are expensive and prone to error. Even when it should therefore be possible to measure a seal leak in any way—in order to establish when a sealing element is damaged, if applicable, and must be exchanged—it is both more complicated and also more costly in this way.

The drainage bore is preferably arranged so that it signals to a user in a technical manner that a sealing leak is present, e.g. that it can be observed or respectively is visible directly from the exterior.

In already known metering systems therefore mostly a sealing leak is generally only established when the metering material has already exited from the metering system and has dripped or respectively run onto the workpiece. In order to not only allow this problem to occur at all, and to anticipate it, the seals are therefore exchanged or respectively renewed there preventively after a specified usage cycle. However, the seals are thus neither exhausted up to the actual failure, nor is this method economical or sustainable.

For the dimensions of the individual portions, both in longitudinal direction of the tappet and also transversely thereto, there are also different possibilities, which are mentioned further below.

In a preferred variant, the tappet can have, as already mentioned above, a tappet tip portion between tappet tip and fluidic portion. Such a tappet tip portion is to be understood to mean a portion along the tappet which has an increasing or respectively decreasing outside diameter (depending on the view) from its start up to its end. In other words, the tappet tip portion can therefore adjoin the tappet tip by one end and the fluidic portion by the other end. Here, an outside diameter of the tappet tip portion can taper conically from an outside diameter of the fluidic portion conically to an outside diameter or respectively double radius of the tappet tip. In other words, the outside diameter of the tappet tip portion can decrease conically towards the tappet tip.

In operation in the assembled state of the valve, the tappet is arranged in the valve so that the fluidic portion of the tappet is situated entirely in the valve chamber. At the upper end of the fluidic portion, the membrane seal sits on the shoulder to the second guide sleeve portion, so that the valve chamber is sealed upwards. Adjoining the fluidic portion at the lower end of the fluidic portion is the tappet tip portion and the tappet tip, which in the disengaged or respectively deflected closed position (the restoring element is then compressed maximally or alternatively drawn apart) sit in the sealing seat or respectively valve seat of the nozzle or respectively of a nozzle insert which is able to be used as a nozzle. In the starting position, the tappet tip can be spaced apart with respect to the valve seat by a stroke length, in order to then be able to be ejected on a stroke accordingly into the closed position. Preferably, the tappet tip and the conical tappet tip portion can together in shape or respectively exterior shape and size be adapted in an accurately fitting manner to the conically tapering interior shape of the associated nozzle or respectively of a nozzle insert which is able to be inserted for the nozzle, in order to securely seal in the closed position.

Preferably, a length of the tappet tip portion for an associated nozzle or for a nozzle insert as nozzle of the valve can vary depending on the radius of the tappet tip. Here, the radius can in turn depend on the desired application and the metering material.

Alternatively or additionally, a length of the tappet tip portion for an associated nozzle can preferably amount to at least 0.5 mm, particularly preferably at least 2.5 mm and most particularly preferably at least 5 mm.

Alternatively or additionally, the length of the tappet tip portion for the associated nozzle can preferably, however, amount to a maximum of 5 mm, particularly preferably a maximum of 7.5 mm, most particularly preferably 10 mm.

Figure 2:
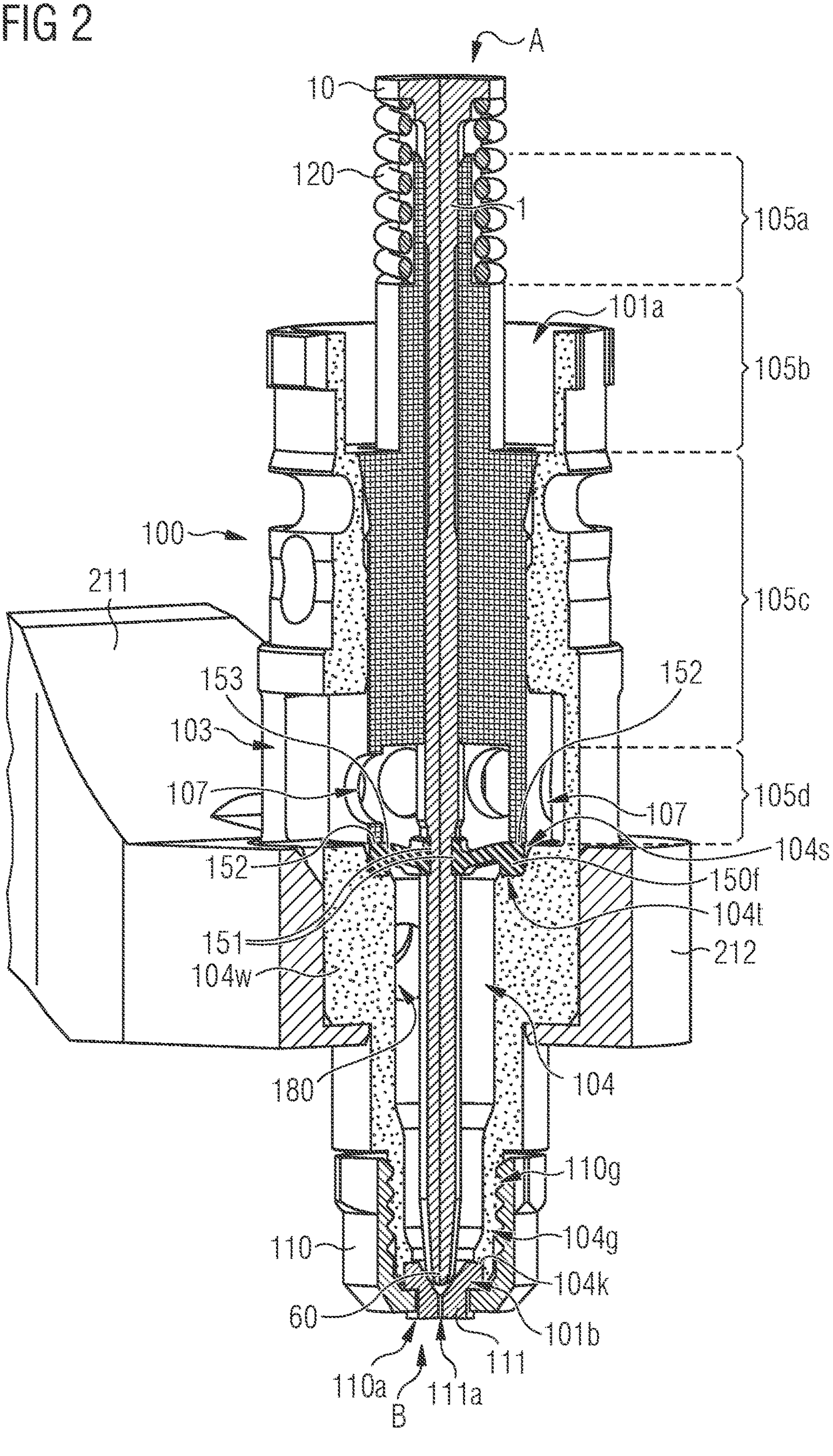
Figure 3:
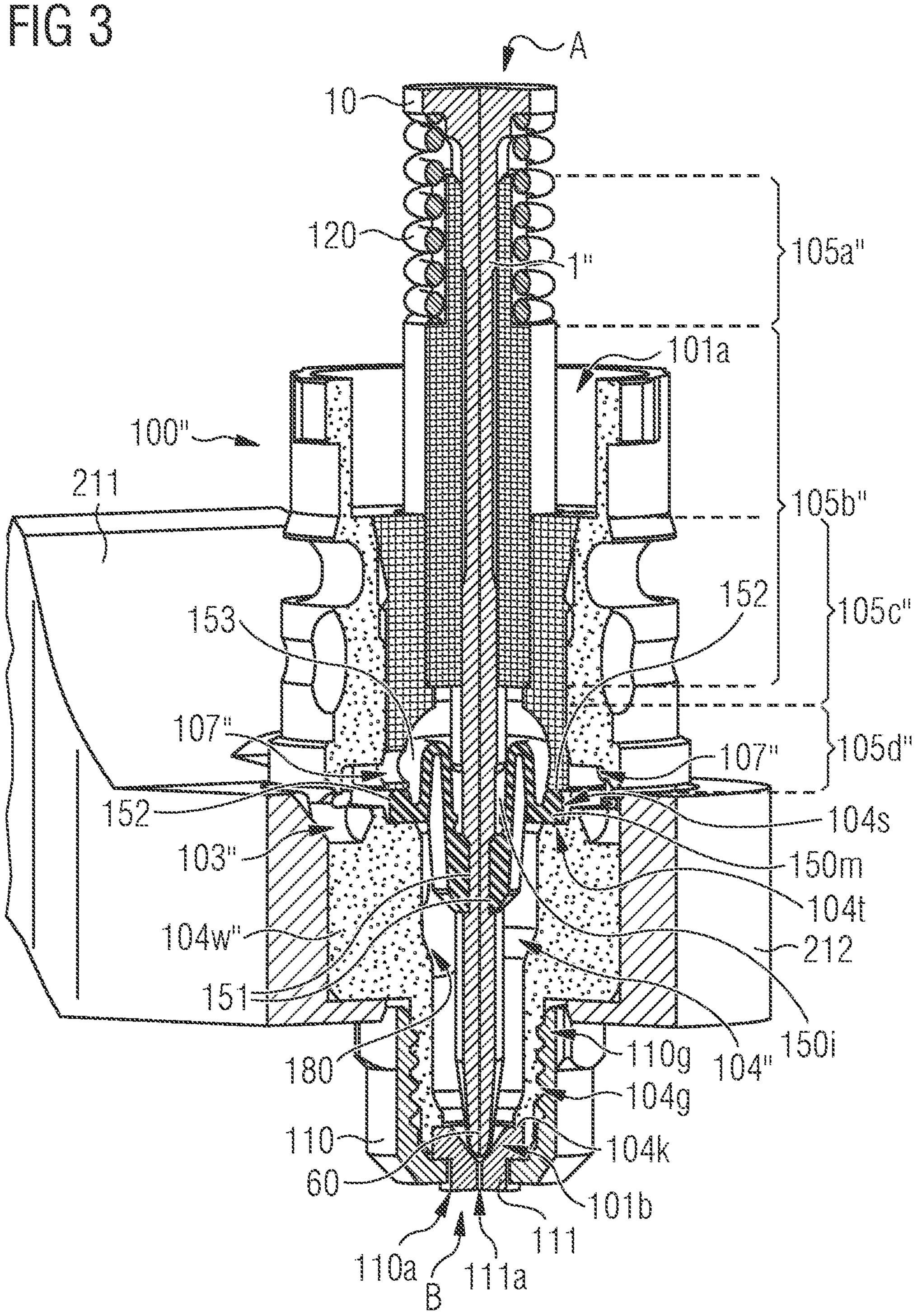
Figure 4:
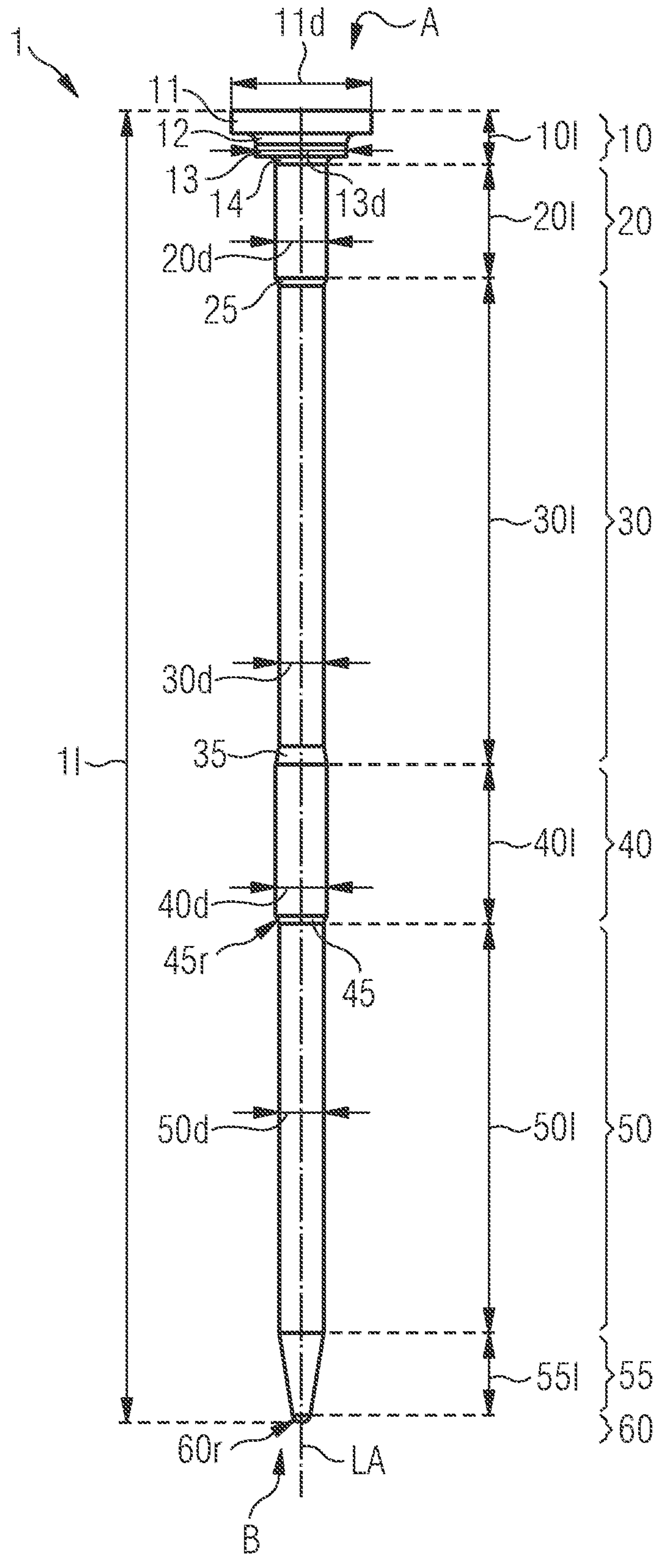
Figure 5:
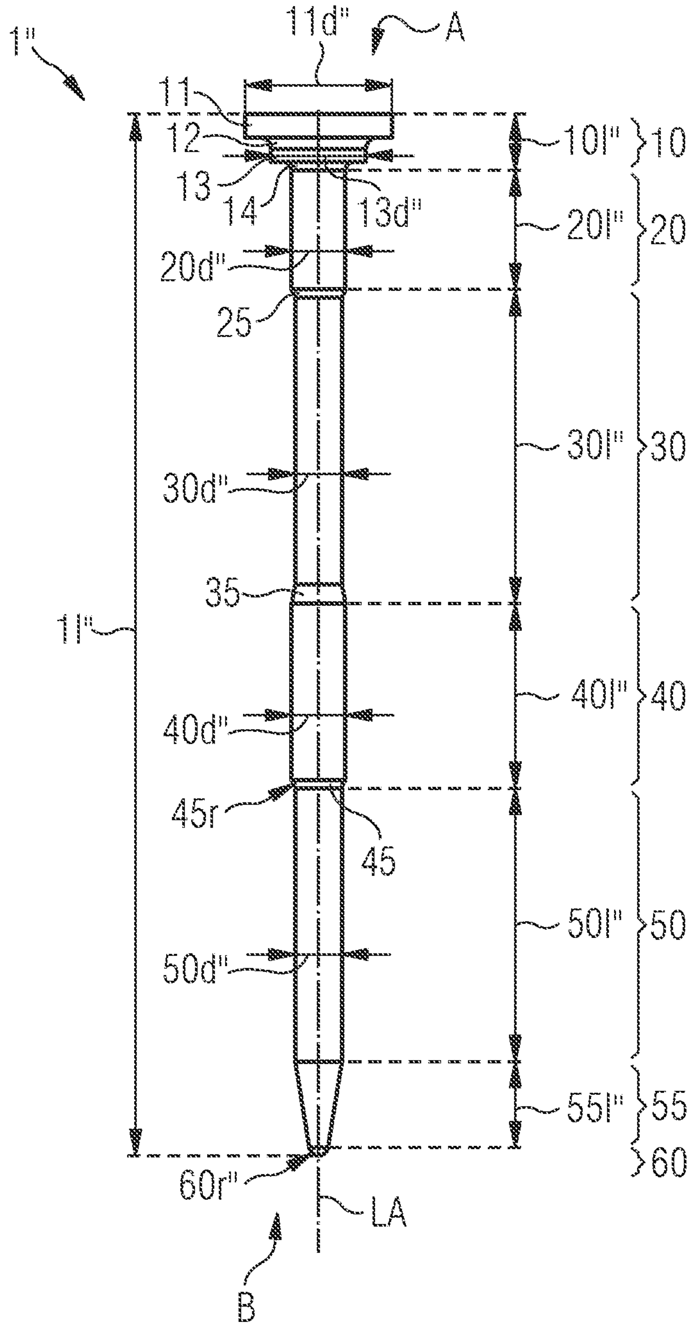
Figure 6:
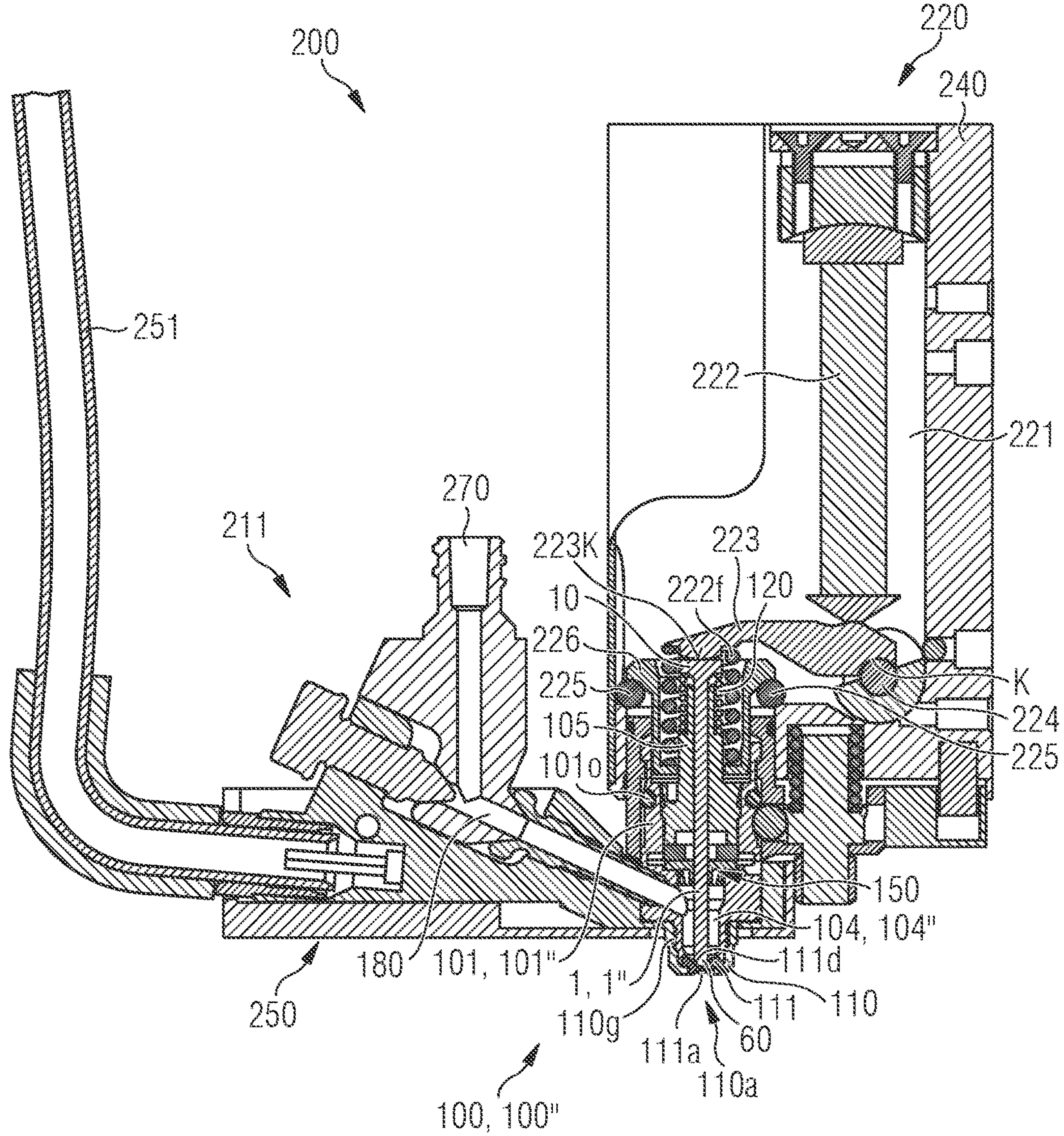

The invention is explained once again more closely in the following with reference to the enclosed figures with the aid of example embodiments. Here in the various figures the same components are provided with identical reference numbers. The figures are generally not to scale. There are shown:

FIG. 1 a perspective three quarter section view of a first variant of a first example embodiment of a valve tappet rod according to the invention in a first example embodiment of a valve according to the invention of a metering system, illustrated in part, with a meander-shaped membrane seal, FIG. 2 a perspective three quarter section view of a second variant of the first example embodiment of a valve tappet rod according to the invention in the example embodiment of a valve according to the invention according to FIG. 1, with a flat membrane seal, FIG. 3 a perspective three quarter section view of a second example embodiment of a valve tappet rod according to the invention in a second example embodiment of a valve according to the invention of a metering system illustrated in part, with a meander-shaped membrane seal as in FIG. 1, FIG. 4 an isolated view of the first example embodiment of the valve tappet rod according to the invention of FIG. 1, FIG. 5 an isolated view of the third example embodiment of the valve tappet rod according to the invention of FIG. 3, FIG. 6 a roughly schematic sectional illustration of the structure of the metering system of FIG. 1, with a sliding seal.

With the aid of FIGS. 1 to 3 firstly the similarities of the example embodiments which are illustrated—only in part—of a metering system 200 according to the invention, with a valve 100, 100" according to the invention are described, wherein here the remaining components of the metering system 200 were cut off at the expense of an enlarged illustration of the valve 100, 100".

FIG. 6 shows for this an overall view, in which the entire structure of a metering system, as is known from DE 10 2017 122 034 A1, roughly schematically by way of example in slightly modified form in partial section. In so doing, in particular here the sealing element 150 is a sliding seal which is arranged around the tappet 1, 1" and on a movement of the tappet 1, 1" slides along therewith on a radially inner sealing point. In order to make clear here the interplay of the essential components for the invention, only a valve 100, 100" and a part of the actuator unit 220 of the metering system 200 required for actuation are illustrated schematically in section. The actuator unit 220 is therefore only to be seen roughly schematically, and the details of the valve 200, 100" are not illustrated owing to the minimized representation in the overview. This applies in particular also for the details of the valve tappet rod 1, 1", as e.g. the different portions thereof 20, 30, 40, 50, 55 etc. (Explanation follows later). In addition here, the valve 100, 100" shown in FIG. 6 also stands only representatively for every other valve 100, 100" according to the invention, as is shown more precisely for example in one of FIGS. 1 to 3.

By comparison, FIG. 1 shows a particularly preferred variant of an example embodiment of the metering system 200 with a meander-shaped membrane seal 150*m* as sealing element 150 in the valve 100. In FIG. 2 a further preferred variant of the example embodiment is illustrated of the metering system 200 with a flat membrane seal 150*f* in the valve 100. Except for the membrane seals 150*f*, 150*m* and correspondingly adapted dimensions 30*l*, 40*l* of a narrow portion 30 and of a second guide sleeve portion 40 of the valve tappet rod 1, however, all components are identical here. FIG. 3 shows an example embodiment of the metering system 200 according to the invention with a second example embodiment of a valve 100" according to the invention.

In the valve 100 shown in FIG. 1, a first variant of a first example embodiment of a valve tappet rod 1 according to the invention is arranged, as is illustrated in FIG. 4. FIG. 2 shows a second variant of the first example embodiment of the valve tappet rod 1 according to the invention in the respective valve 100. This variant has a shortened narrow portion 30 and a second guide sleeve portion 40 which is lengthened for this, whereby the tappet 1 has somewhat more brake friction compared to the first variant (however as a whole still distinctly less than without narrow portion 30). In FIG. 3 a third example embodiment of a valve tappet rod 1" according to the invention is arranged in the valve 100", which is to be seen isolated in FIG. 5.

As can be seen from FIGS. 1 to 3 and 6, in addition to the valve 100, 100", a (partially illustrated) fluidic unit 211 (here in FIG. 6 without loss of generality formed at the same time as a bayonet fluidic 211, as is already known from the basic principle and from the bayonet coupling to the actuator unit from DE 10 2017 122 034 A1) and a valve support 212, which surrounds the valve 100, 100" (in the region of a valve chamber 104, 104" of a valve body 101, 101" of the valve 100, 100") and serves to couple the valve 100, 100" inter alia with a supply line for the metering material from a metering material container (not illustrated), belong to the main components of these metering systems 200. The supply line, in connected state adjoins here a feed channel 180 in the valve 100, 100" (more precisely a feed channel 180 into the valve chamber 104, 104" through a wall 104*w*, 104*w"* of the valve chamber 104, 104" of the valve 100, 100").

The metering system 200, as already mentioned above and to be seen in FIG. 6, further comprises an actuator unit 220 for actuation of the valve tappet rod 1, 1", which is arranged here substantially above the valve 100, 100" or respectively above a tappet head 10 of the valve tappet rod 1 in an actuator chamber 221 of a housing 240 of the metering system 200 (further details concerning the actuator unit 220 are additionally explained later). The metering system 200 shown in FIG. 6 comprises furthermore a metering material storage holder 270 for holding the exchangeable metering material container and a heating device 250 or respectively a heating module 250 with at least one heating connection cable 251, which as shown here was mounted for example on the valve holder 212 of the fluidic unit 211. The metering material can thus be heated up in operation to a desired metering temperature as required. Relative direction indications such as "above", "below", "on the inner side", "on the outer side", "on the front side", "on the rear side", "on the longitudinal side" etc. refer here arbitrarily to the illustration in the figures.

The valve 100, 100" of the metering system 200 serves basically to be able to deliver or respectively eject metering material in a metered manner by means of the valve tappet rod 1, 1" moved by the actuator unit 220, as is additionally explained further below.

The overall structure of a valve 100, 100" can be described representatively by means of the valve 100 as follows: The valve 100 has an elongate, hollow-cylindrical valve body 101 (the longitudinal direction corresponds here in the figures to a vertical direction), or respectively a fitting 101 (represented in a dotted manner), which valve body 101 here in FIG. 1 in the upper part encloses a guide sleeve 105 (represented in a checked manner) and in the lower part is formed as a funnel-shaped valve chamber 104 for the metering material.

For this, the valve body 101 is inserted until approximately at the height of the valve chamber 104 into a circular opening of the already previously mentioned valve support 212 of the fluidic unit 211 and is thus (here in the figures) held at the same time in an upright position. As can be seen in FIG. 6, the valve body 101 is thus mounted or respectively embedded in the metering system 200 laterally between two cylinder pins 225 in a guide cylinder 226. Here, an actuator spring 222*f* of the actuator unit 220 is arranged around the valve body 101 in the guide cylinder 226 so that the actuator spring 222*f* pushes a lever 223 of the actuator unit 220 upwards at the end at which the lever 223 comes in contact with the tappet 1. The mode of operation of the actuator unit 220 is additionally explained later somewhat more precisely. As a whole, however, this actuator unit 220 is also described more precisely in DE 10 2017 122 034 A1.

At this point, for the sake of completeness, it is pointed out that the metering system 200 according to the invention is not restricted to this orientation in the metering of a metering material. It is therefore for example also possible to meter in a horizontal or other orientation (e.g. overhead).

As already mentioned above, the valve tappet rod 1, also designated in the following simply as tappet 1, sits within the guide sleeve 105, which tappet rod is described later in detail. Between a tappet head 10 of the tappet 1 (explanation further below) and the guide sleeve 105 a restoring element 120 is arranged, which is likewise further explained later. Further below (in the direction of the tappet tip 60) along the tappet 1 approximately at the height of the valve support 212, as sealing element 150, as already mentioned, the meander-shaped membrane seal 150*m* (see FIG. 1) is arranged around the tappet 1 and between the guide sleeve 105 and the valve chamber 104 of the valve body 101, which is also explained later more precisely.

As illustrated in detail in FIG. 1, the hollow-cylindrical or respectively sleeve-shaped valve body 101 comprises an upper opening 101*a* on the tappet head side (here distinctly above the valve support 212), a lower opening 101*b* on the tappet tip side (beneath the valve support 212), and therebetween, in a middle region, a number of open viewing windows 103 in the respective portion of the outer wall of the valve body 101 (the lower edge of the viewing windows 103 lies here at the height of the upper edge of the valve support (212).

Between the upper and the lower opening 101*a*, 101*b* the inside diameter of the valve body 101 changes multiple times. As a whole, the inside diameter reduces from the upper opening 101*a*, through which inter alia the guide sleeve 105 is introduced, up to an upper edge of the viewing windows 103, and again form a lower edge of the viewing windows 103 (or respectively an upper edge of the valve chamber 104) up to the lower opening 101*b* respectively substantially in several stages. Therebetween in the region of the viewing windows 103 the inside diameter of the valve body 101 (or respectively the cavity on the inner side between the viewing windows 103 in the outside walls) is continuously of equal size.

Here, the region above the viewing windows 103 on the inner side in the valve body 101 is formed so that the guide sleeve 105 sits screwed in there, after it has been screwed in from above into the provided position for the finished assembly of the valve 100, as is additionally explained more precisely later. For this, an inner side of the wall of the valve body 101 has in this region at least one (internal) thread portion or respectively an internal thread, by means of which an external thread or respectively an (external) thread segment 102 of the guide sleeve 105 is screwed, as is additionally explained further below, so that a relative movement is prevented in longitudinal direction during operation.

Alternatively, an inner side of the wall of the valve body 101 can have in this region at least one step for this, into which a projection or respectively bead of the guide sleeve 105 can be engaged or respectively clicked in, in order to connect the two components with one another without a rotary movement.

Independently thereof on the outer side, approximately at the height of this thread portion on the inner side, a valve body annular groove 101*n* is worked into the outer side of the wall of the valve body 101, in which in the finished coupled-in state of the valve 100 in a metering system 200 a typical O-ring 101*o* or respectively a ring seal 101*o* (see FIG. 6) of the valve 100 sits. This ring seal 101*o* makes provision that a plug coupling part of the fluidic unit 211 is sealed against a counter plug coupling part of the actuator unit 220 in assembled state in an annular manner with respect to one another, as is described in DE 10 2017 122 034 A1.

Beneath the viewing windows 103, the interior of the valve body 101, as already mentioned, forms the nozzle chamber or respectively valve chamber 104. The valve chamber 104 comprises as upper closure or respectively as a flat upper edge a sealing edge 104*t*, on which the sealing element 150 rests as a membrane side 150*f*, 150*m*. Further downwards, in the direction of the opening 101*b* of the valve body 101 on the tappet tip side, firstly the actual valve chamber 104 extends. Above a step in the wall 104*w* of this valve chamber 104, reducing the inside diameter, the feed channel 180, already mentioned above, opens into the valve chamber 104, through which the metering material is directed into the valve chamber 104 in operation.

Beneath this step in a final third of the valve chamber 104, a clamping edge 104*k*, likewise reducing the inside diameter, projects in a flange-like manner into the valve chamber 104.

Here, the constriction of the inside diameter of the valve chamber 104 runs from above conically or respectively in a funnel-shaped manner (therefore becoming continuously narrower) towards this clamping edge 104*k*. In contrast thereto, the clamping edge 104*k*, coming from below, constitutes a ledge becoming abruptly wider or respectively a right-angled step in the course of the inner wall or respectively wall 104*w* of the valve chamber 104. This step or respectively clamping edge 104*k* serves as a stop for a nozzle 111 or respectively an inserted nozzle insert 111, as is explained in the following.

On the outer side in the region beneath the step, the valve chamber 104 or respectively the valve body 101 is provided with an external thread 104*g*, in order to screw tightly thereon a nozzle adjusting nut 110. The nozzle adjusting nut 110 here is a screwable, hollow-cylindrical sleeve which comprises a central, circular nozzle adjusting nut opening 110*a* which is smaller than the opening 101*b* of the valve body 101 on the tappet tip side. Here, the nozzle adjusting nut 110*a* is formed in a lower portion of the nozzle adjusting nut 110 with a smaller hole inside diameter than in an upper portion of the nozzle adjusting nut 110. The upper portion of the nozzle adjusting nut 110 is, in addition, equipped with an internal thread 110*g* which is screwed onto an external thread 104*g* of the valve body 101 or respectively the valve chamber 104. Between the screwed-on nozzle adjusting nut 110 and the lower end of the valve chamber 104, more precisely the right-angled clamping edge 104*k* of the valve chamber 104, a nozzle insert 111 (the actual nozzle 111) is arranged, which on screwing-in of the nozzle adjusting nut 110 is clamped against the valve chamber 104. The nozzle insert 111 is also formed with an opening or respectively nozzle opening 111*a*. The nozzle insert 111 has on the inside on its upper side a conically downwardly tapering or respectively funnel-shaped inner shape (as valve seat 111*d* or respectively sealing seat 111*d* for the tappet 1), in order to channel the metering material, to accelerate the ejection speed and to regulate the ejection quantity (depending on the inserted nozzle insert 111). Accordingly, finer structures or respectively forms of the metering material can thus also be metered by the metering system 200 on a workpiece.

As can be seen in FIG. 1, the guide sleeve 105 (illustrated in a checked manner) which has already been mentioned several times above, comprises in its longitudinal direction four regions for the tappet 1 which are to be differentiated according to their function. At an end region situated in operation nearer at the tappet head 10 of the tappet 1, the guide sleeve 105 is formed as a restoring element—or respectively spring bearing 105*a*, i.e. an outside diameter of the spring bearing 105*a* is minimally smaller than an inside diameter of a wound restoring element 120, here in practice an associated coil spring 120, which is used for this.

A restoring—or respectively spring stop 105*b* of the guide sleeve 105 adjoins the spring bearing 105*a*, the outside diameter of which stop is wider than that of the spring bearing 105*a* thereabove. This outside diameter is, for example, precisely so wide that it terminates flush with an outside diameter of the coil spring 120.

The coil spring 120, as is usual for such a torsion—or respectively coil spring 120, is helical or respectively "hollow-cylindrical" and has an at least needs-based spring force (as restoring force) which is coordinated with a force of the actuator unit 220 of the metering system 200.

The coil spring 120 in the finished assembled state is thus guided in a flush manner between the spring stop 105*b* and the tappet head 10 of the tappet 1, i.e. it is pushed on at least partly on both sides onto a bolt-shaped stop 10, 105*b* for the coil spring 120, relative to which the coil spring 120, viewed radially, terminates flush without a projection, as is explained further in the context of the assembly at the end. With this arrangement of the coil spring 120, provision is made that the coil spring 120, after a compression by an actuator 222 or respectively a lever 223 of the actuator unit 220, exerts a desired, rectilinear, oppositely directed restoring force onto the tappet 1 as intended, whereby the tappet 1, after an impulse of the actuator unit 220 in a chronologically offset manner automatically arrives or respectively is moved back again into the starting state.

Here, the movement mechanism of the actuator 222 of the actuator unit 220 behaves as follows: The actuator 222 acts on a region of a lever 223 of the actuator unit 220, which is rotatably mounted at the end in a lever bearing 224 about a tilting axis K. Through the actuator 222—between the lever bearing 224 and a contact surface 223*k* of the lever 223 with the tappet head 10—acting on the lever 223, the impulse of the actuator 222 can be deflected via the lever 223 and space can be created above the tappet head 10.

At this point, for the sake of completeness, it is pointed out that a metering system 200 according to the invention preferably has an actuator unit 220 with a piezo actuator, e.g. a piezo stack. However, this does not rule out that a different actuator mechanism could also be used, such as e.g. a pneumatic-driven actuator etc.

Adjoining the spring stop 105*b* of the guide sleeve 105 is a thread region 105*c* which is distinguished in that the guide sleeve 105 is connected therewith on installation with the valve body 101 or respectively is screwed in the valve body 101, alternatively engaged or respectively clicked in, as mentioned above. For this, the guide sleeve 105 comprises at least one connecting element, here, in practice, a thread segment 102, i.e. a protruding thread segment 102, which engages into a corresponding internal thread of the valve body 101.

Again further below (in the direction of the nozzle 111) on an opposite side of the spring stop 105*b* a hollow-cylindrical region 105*d* adjoins the thread region 105*c* of the guide sleeve 105. This hollow-cylindrical region 105*d* is distinguished in that it is situated at the lower end of the guide sleeve 105 and a predominant part of the diameter (viewed in cross-section) of the guide sleeve 105 is recessed here on the face side, so that the guide sleeve 105 consists there merely of an outer annular hollow-cylindrical wall portion, and a cavity or respectively a pre-chamber is again situated in the guide sleeve 105 to the nozzle side. In other words, in the hollow-cylindrical region 105*d* of the guide sleeve 105 only annular wall portions are left, wherein these are advantageously additionally provided here with radially running drainage bores 107. The latter are basically able to be selected as desired with regard to their shape, e.g. round, oval, semicircular, angled, such as e.g. rhomboid, trapezoidal, star-shaped, triangular etc. or elongated as a slit or suchlike running around at least partly along the circumference. The so-called drainage bores 107 designate simply through-openings or respectively outwardly continuous openings in the hollow-cylindrical region 105*d* of the guide sleeve 105, through which—as the name already states—material, in this case possibly metering material, could be directed away. They make provision that metering material which has arrived unintentionally into the hollow-cylindrical region 105*d*, can also arrive outwards again from the hollow-cylindrical region 105*d*. How the metering material could generally penetrate into the hollow-cylindrical region 105*d* of the guide sleeve 105 is additionally explained further below.

For the remaining, previously mentioned regions 105*a*, 105*b*, 105*c*, on the other hand, it applies that a bore 106 on the face side from an opening 106*a* on the tappet head side (here at the upper end of the spring bearing 105*a*) up to an opening 106*b* on the tappet tip side (at the upper end of the hollow-cylindrical region 105*d*) passing through these regions in longitudinal direction has a continuously consistent borehole diameter 106*d*, which is substantially smaller relative to the previously mentioned bore of the hollow-cylindrical region 105*d*.

The advantage of a continuously uniform bore 106 in the guide sleeve 105 lies in that the guide sleeve 105 is thereby easier to produce and, in addition, can be manufactured from hard metal or from another hard material, as is shown in FIG. 3. This makes provision that at least an inner guide sleeve part 105*a*", 105*b*", in contact with the tappet 1, can be formed from a distinctly more wear-resistant and more robust material, as is further explained later.

Beneath the hollow-cylindrical region 105*d* of the guide sleeve 105, the already mentioned sealing element 150 is arranged, here formed in practice in FIG. 1 as a meander-shaped membrane seal 150*m*. This "ring seal" seals around a portion of the tappet 1 and between an annular lower edge of the hollow-cylindrical region 105*d* of the guide sleeve 105 and an annular upper edge or respectively sealing edge 104*t* of the valve chamber 104.

A radially inner annular first sealing point 151 of the membrane seal 150*f*, 150*m* seals here in that it lies tightly against the tappet 1 with undersize relative to the outside diameter 50*d* of the fluidic portion 50. Here, above this first sealing point 151 (as part of the membrane seal 150*m*, as is shown here in FIGS. 1 and 2) a fixed inner sleeve 150*i* can be arranged, which is mounted in a positionally fixed manner in the membrane seal 150*m* by means of a groove-tongue connection. The inner sleeve 150*i* has an inside diameter which abuts against a ledge 45 on the valve tappet rod 1, as is additionally explained further below.

A radially outer annular second sealing point 152 is situated between the lower edge of the hollow-cylindrical region 105*d* and the upper edge of the valve chamber 104. This second sealing site 152 is compressed from above and below on installation of the guide sleeve 105 in the valve chamber 104 and thus seals continuously by the described (contact) pressure.

Between these two sealing points 151, 152 a flexible and/or elastic transition region 153 or respectively a membrane 153 makes provision that the membrane seal 150*f*, 150*m* seals the valve chamber as intended upwards to the guide sleeve 105, so that if possible no metering material arrives into the hollow-cylindrical region 105*d* of the guide sleeve 105.

If, nevertheless, metering material e.g. in the event of a seal failure were to arrive upwards through the membrane seal 150*f*, 150*m*, the already mentioned drainage bores 107 in the hollow-cylindrical region 105*d* make provision that the metering material arrives into a region visible for the user and is noticed visually there by means of the viewing windows 103 (e.g. directly by the user or via a camera for the user). So that a user gains additional time in order to be able to establish this defect promptly, in addition a particularly large amount of space is present in the hollow-cylindrical region 150*d* in order to be able to receive metering material exiting from the valve chamber 104 for as long as possible in the event of a possible seal failure.

Moreover, further metering material would collect between an outer side of the radially outer sealing point 152 of the membrane seal 150*f*, 150*m* and an outwardly adjoining wall of the valve chamber 104, as these are spaced somewhat relative to one another. This spacing respectively therefore constitutes a type of cavity or respectively a collecting basin 104*s* beneath and outside the guide sleeve 105 or respectively the drainage bores 107. Only when this collecting basin 104*s* also overflows does the metering material exit out of the viewing windows 103. A user therefore has longer time to establish a seal failure visually by looking into the viewing windows 103 before an overflowing would actually occur. He can then make provision for an exchange of the valve 100, 100" before overflowing metering material can arrive onto regions of workpieces which are to be kept clean.

The rather flat membrane seal 150*f* shown in FIG. 2 is also formed so that the metering material would firstly collect there on the membrane seal 150*f* before it would exit through the drainage bores 107.

In regular operation, this spacing or respectively material depletion through the viewing windows 103 and drainage bores 107 has, however, additionally a further principal function. It provides for a thermal insulation, so that a heat conduction or respectively a heat exchange into the regions 105*a*, 105*b*, 105*c*, 105*d* situated thereabove, e.g. in the case of a heated or cooled metering material, or vice versa, e.g. in the case of a particularly heated actuator downwards, is reduced.

With the aid of FIG. 4, a first preferred example embodiment of a valve tappet rod 1 or respectively a tappet 1 according to the invention is now described, as it can be used in the example embodiment according to FIG. 1.

As can be seen from the isolated view of the tappet 1 in FIG. 4, the tappet 1 concerns an elongate, (cylindrical) body with a longitudinal axis LA in longitudinal direction of the body. Along the longitudinal axis LA the tappet 1 comprises portions 10, 20, 30, 40, 50, 55, 60 of different length, which differ from one another inter alia in their width or respectively in their outside diameter 11*d*, 13*d*, 20*d*, 30*d*, 40*d*, 50*d* or respectively in their radius 60*r* perpendicularly to the longitudinal axis LA.

The tappet 1 is formed in an upper head region A with a tappet head 10 and at the opposite lower end B—spaced apart therefrom in longitudinal direction along the longitudinal axis LA—with a tappet tip 60. Between the tappet head 10 and the tappet tip 60 of the tappet 1, the portions 20, 30, 40, 50, 55 are situated, which are respectively formed with a preferred length 20*l*, 30*l*, 40*l*, 50*l*, 55*l*. As a whole, the tappet 1 therefore has here a total length 1*l* which corresponds to the sum of the lengths 10*l*, 20*l*, 30*l*, 40*l*, 50*l*, 55*l*. The length of the tappet tip 60 is to be disregarded here.

A first guide sleeve portion 20 adjoins the tappet head 10. Adjoining this in turn is a narrow portion 30, followed by a second guide sleeve portion 40. Adjoining thereon is a fluidic portion 50 and then a tappet tip portion 55, which at the end side continues directly into the tappet tip 60.

The tappet head 10 extends here along the longitudinal axis LA via two portions 11, 13, namely an actuating flange 11 (on the face side as completion of the head region A), and a guide ledge 13, which continues over a short, thinning transition 14 or respectively transition portion into the first guide sleeve portion 20. The two portions 11, 13 differ from one another substantially in their outside diameter 11*d*, 13*d*. The outside diameter 11*d* of the actuating flange 11 is greater here than the outside diameter 13*d* of the guide ledge 13. The actuating flange 11 of the tappet 1 serves the actuating member or respectively lever 223 of the actuator unit 220 (see FIG. 6) as a point of attack in operation. Here, the actuating flange 11 is at least temporarily in contact with the contact surface 223*k* of the lever 223. At the same time, the larger outside diameter 11*d* of the actuating flange 11 makes provision that the coil spring 120, when it is brought into its operating position at the tappet head 10, strikes upwards on the tappet 1. The outside diameter 13*d* of the guide ledge 13 is selected here so that the helical coil spring 120 is guided on the inside through the guide ledge 13, i.e. the inside diameter of the coil spring 120 is just so large that it fits onto the guide ledge 13.

The above-mentioned transition 14 from the guide ledge 13 to the first guide sleeve portion 20 is formed in a fillet-shaped manner. The outside diameter 20*d* of the first guide sleeve portion 20 is namely smaller than the outside diameter 13*d* of the guide ledge 13. At the lower end of the first guide sleeve portion 20, a sharp, relatively abrupt ledge 25 is formed to the narrow portion 30, the outside diameter 30*d* of which is again smaller than the outside diameter of the first guide sleeve portion 20. This ledge 25 is short and "steep" relative to a transition 35 to the second guide sleeve portion 40 at the lower end of the narrow portion 30. This transition 35 can therefore be described rather as a "flat ramp" or respectively slope, which is relatively long and has a scarcely noticeable gradient.

At the lower end of the second guide sleeve portion 40 in turn a sharp ledge 45 or respectively a fillet 45 is formed. This fillet 45 preferably comprises a fillet radius 45*r* of at least 0.01 mm, particularly preferably at least one 0.1 mm, most particularly preferably at least 0.25 mm. It is thereby achieved that here the inner sleeve 150*i*, already mentioned above, of the membrane seal 150*f*, 150*m* is held in position particularly well along the tappet 1 on an ejection movement (downwards) in operation of the tappet 1 in a valve 100 of a metering system 200. This is because the inner sleeve 150*i* lies with an inner edge directly against the tappet 1 at an upper end region of the fluidic portion 50, wherein the inner sleeve 150*i* and hence the membrane seal 150*m* is moved along as intended in ejection direction through the ledge 45 on an ejection movement of the tappet 1.

The said fluidic portion 50 continues at its lower end almost fluently into the tappet tip portion 55 close to the tappet tip 60. The tappet tip portion 55 of the tappet 1 tapers conically to the tappet tip 60. As already mentioned, the end A of the tappet 10 forms the rounded tappet tip 60, which has here in FIG. 4 a radius 60*r* of R 0.20 mm (with a tolerance of +−0.01 mm, in order to be able to subsequently achieve comparable results with the new component on an exchange of a defective component). This radius 60*r* is adapted here by way of example to the nozzle 111 of the valve 100. Generally, however, it is not necessary to adapt the radius 60*r* precisely to the nozzle 111 of the valve 100. Different size combinations are also possible here, such as for example a smaller radius of the tappet tip 60 with a larger nozzle cross-section.

In this respect it is pointed out that the radius 60*r* within the scope of the invention can vary from a particularly small radius, therefore almost "pointlike", up to a rather large radius 60*r*, i.e. for example can also be greater than a diameter 30*d*, 50*d* of the valve tappet rod 1.

The individual portions 10, 20, 30, 40, 50, 55 60 of the tappet 1 differ on the one hand by their length along the longitudinal axis LA and on the other hand by their width or respectively their outside diameter in a direction perpendicular to the longitudinal axis LA. Otherwise, however, they have no substantial distinguishing features.

In a first variant of a preferred first example embodiment of the tappet 1, as is shown in FIG. 4, the portions 10, 20, 30, 40, 50, 55 of the tappet 1 can be formed with the following lengths 10*l*, 20*l*, 30*l*, 40*l*, 50*l*, 55*l*.

The tappet head 10 preferably has a length 10*l* of ca. 2 mm, the first guide sleeve portion 20 a length 20*l* of ca. 3.5 mm, the narrow portion 30 a length 30*l* of ca. 16 mm, the second guide sleeve portion 40 a length 40*l* of ca. 5 mm, the fluidic portion 50 a length 50*l* of ca. 13.7 mm and the tappet tip portion 55 (together with the tappet tip 60) a length 55*l* of ca. 3 mm. This tappet 1 therefore has a preferred overall length 1*l* of ca. 43.2 mm.

In a second variant of a preferred first example embodiment of the tappet 1, the portions 10, 20, 30, 40, 50, 55 of the tappet 1 can, however, also be formed with the following lengths: 10*l*, 20*l*, 30*l*, 40*l*, 50*l*, 55*l*:

Preferably, the tappet head 10 has a length 10*l* of ca. 2 mm, the first guide sleeve portion 20 a length 20*l* of ca. 3.5 mm, the narrow portion 30 a length 30*l* of ca. 10 mm, the second guide sleeve portion 40 a length 40*l* of ca. 5 mm, the fluidic portion 50 a length 50*l* of ca. 19.7 mm and the tappet tip portion 55 (together with the tappet tip 60) a length 55*l* of ca. 3 mm. This tappet 1 thus likewise has a preferred overall length 1*l* of ca. 43.2 mm. In this variant, however, the second guide sleeve portion 40 is arranged offset or respectively displaced by ca. 6 mm in the direction of the tappet head 10 and thus the narrow portion 30 is shorter by ca. 6 mm and accordingly the fluidic portion 50 is longer by ca. 6 mm.

In a particularly preferred, second example embodiment of the tappet 1" according to FIG. 5, the lengths 30*l*", 50*l*", 55*l*" of the portions 30, 50, 55 are shorter and only the length 40*l*" of the portion 40 is somewhat longer. The tappet 1" is thus nevertheless shorter as a whole.

Particularly preferably, the tappet head 10 has a length 10*l*" of ca. 2 mm, the first guide sleeve portion 20 a length 20*l*" of ca. 3.5 mm, the narrow portion 30 a length 30*l*" of ca. 10 mm, the second guide sleeve portion 40 a length 40*l*" of ca. 5.95 mm, the fluidic portion 50, the tappet tip portion 55 and the tappet tip 60 a length 50*l*", 55;", 60*r* of ca. 11.7 mm. This tappet 1" therefore has a particularly preferred overall length 1*l*" of ca. 33.2 mm.

This—as a whole—shorter tappet 1" is perfectly suitable e.g. for use in a valve 100" of a metering system 200 as is illustrated in FIG. 3.

This likewise only partially illustrated, particularly preferred example embodiment of a metering system 200 according to the invention with a second example embodiment of a valve tappet rod 1" according to the invention, shows a valve 100" in which in turn by way of example a meander-shaped membrane seal 150*m* is installed as sealing element 150. However, a flat membrane seal 150*f* could also be used, as is shown in FIG. 2.

Such a metering system 200, as that of FIG. 3, presents itself when one does not wish to discharge any metering materials which must firstly also be heated or respectively warmed before metering. The tappet 1" or respectively the valve 100" can then also be formed shorter, as no heating unit has to be present in the metering system 200 which would have to be arranged at a certain distance with respect to the tappet tip 60.

In contrast to the example embodiment described above, the body of the valve 100" for the metering system 200 is therefore shorter here.

As a further specific feature, the guide sleeve 105" already mentioned above consists here of an inner guide sleeve part 105*a*", 105*b*" and an outer guide sleeve part 105*c*", 105*d*". The inner guide sleeve part 105*a*", 105*b*", which thus has a shape which is very simple to produce, can therefore be produced comparatively favourably from a more robust substance or respectively material, which wears less quickly in the case of a continuous stress (along the bore 103). For example, the inner guide sleeve part 105*a*", 105*b*" could be manufactured from a particularly hard material, such as e.g. hard metal, ceramic, zirconium oxide, silicon oxide, silicon nitride or silicon carbide, and the outer guide sleeve part 105*c*", 105*d*" from a softer and more economical material, such as e.g. stainless steel or suchlike, as the latter is not exposed to any extraordinary stress. The two guide sleeve parts 105*a*", 105*b*", 105*c*" 105*d*" (consisting of spring bearing 105*a*" and spring stop 105*b*" and thread region 105*c*" and hollow-cylindrical region 105*d*") can preferably be connected to one another in a pressing, bonding or in further joining processes.

The hollow-cylindrical region 105*d*" of the guide sleeve 105" differs slightly from the hollow-cylindrical region 105*d* of the guide sleeve 105. The hollow-cylindrical region 105*d*" can be described, rather, as a type of "hollow sphere region", the drainage bores 107" of which turn out to be distinctly smaller owing to the shorter valve body 101". In total instead, however, more smaller drainage bores 107" are present, in order to nevertheless be able to direct away as large quantities of metering material as possible.

For the direction perpendicular to the longitudinal axis LA of the tappet 1, 1", i.e. in transverse direction or respectively diameter direction, for the individual portions 10, 20, 30, 40, 50, 60 of the two example embodiments of the tappet 1, 1" there are the following preferred outside diameters 11*d*, 11*d*", 13*d*, 13*d*", 20*d*, 20*d*", 30*d*, 30*d*", 40*d*, 40*d*", 50*d*, 50*d*" or respectively radii 60*r*, 60*r*".

The actuating flange 11 of the tappet head 10 preferably has an outside diameter 11*d*, 11*d*" of ca. 4.6 mm, the guide portion 13 of the tappet head 10 an outside diameter 13*d*, 13*d*" of ca. 3.15 mm, the first guide sleeve portion 20 an outside diameter 20*d*, 20*d*" of ca. 1.7 mm, the narrow portion 30 an outside diameter 30*d*, 30*d*" of ca. 1.5 mm, the second guide sleeve portion 40 an outside diameter 40*d*, 40*d*" of ca. 1.7 mm, the fluidic portion 50 an outside diameter 50*d*, 50*d*" of ca. 1.5 mm and the tappet tip 60 a radius 60*r* of ca. 0.2 mm and the tappet tip 60 of the second example embodiment of the tappet 1" a radius 60*r*" of ca. 0.35 mm.

All components of the example embodiments of the metering system 200 according to the invention or respectively of the valve 100, 100" according to the invention can be changed separately by a user on site, i.e. disassembled and assembled again in the manner of modular system.

On mounting of the tappet 1, 1" in the valve 100, 100" in the metering system 200, respectively firstly the coil spring 120 is pushed onto the tappet 1, 1" from the tappet tip 60 up to the tappet head 10. Subsequently, the guide sleeve 105, 105" (likewise starting from the tappet tip 60) is pushed onto the tappet 1, 1", so that the coil spring 120 slides over the spring bearing 105*a*, 105*a*" and is guided between tappet head 10 and spring stop 105*b*, 105*b*". Thereupon, the flat membrane seal 150*f* or the meander-shaped membrane seal 150*m* with the already inserted inner sleeve 150*i* (in turn starting from the tappet tip 60) is pushed onto the tappet 1, 1", until it abuts against the hollow-cylindrical region 105*d*, 105*d*" of the guide sleeve 105. Subsequently, the component which has just been assembled is inserted from above into the opening 101*a* of the valve body 101, 101" of the valve 100, 100", and screwed. Thereupon, the finished assembled valve 100, 100" is installed at the corresponding position in the metering system 200, as can be seen in FIG. 6. For this, the valve 100, 100" is inserted into a holding position in the metering system 200 between the two cylinder pins 225, or respectively the actuator spring 222*f* into a guide cylinder 226 of the actuator unit 220.

Finally, it is pointed out once again that the devices previously described in detail only concern example embodiments which can be modified by the specialist in the art in a variety of ways without departing from the scope of the invention. Thus, for example, other restoring elements or sealing elements, such as ring seals etc. are also included in the scope of the invention. Furthermore, the use of the indefinite article "a" or respectively "an" does not rule out that the respective features can also be present several times. Likewise, the terms "arrangement", "element", "module" and "system" do not rule out that the respective component consists of several interacting subcomponents which, if applicable, can also be spatially distributed.

LIST OF REFERENCE NUMBERS

1, 1" valve tappet rod
1*l*, 1*l*" total length of the valve tappet rod
tappet head
10*l*, 10*l*" length of the tappet head
11 actuating flange
11*d*, 11*d*" outside diameter of the actuating flange
12 transition/fillet
13 guide ledge
13*d*, 13*d*" outside diameter of the guide ledge
14 transition/fillet
20 first guide sleeve portion
20*d*, 20*d*" outside diameter of the first guide sleeve portion
20*l*, 20*l*" length of the first guide sleeve portion
25 ledge
30 narrow portion
30*d*, 30*d*" outside diameter of the narrow portion
30*l*, 30*l*" length of the narrow portion
35 transition
40 second guide sleeve portion
40*d*, 40*d*" outside diameter of the second guide sleeve portion
40*l*, 40*l*" length of the second guide sleeve portion
45 ledge/fillet
45*r* fillet radius
50 fluidic portion
50*d*, 50*d*" outside diameter of the fluidic portion
50*l*, 50*l*" length of the fluidic portion
55 tappet tip portion
55*l*, 55*l*" length of the tappet tip portion
60 tappet tip
60*r*, 60*r*" radius of the tappet tip
100, 100" valve
101, 101" valve body/fitting
101*a* opening of the valve body, tappet head side
101*b* opening of the valve body, tappet tip side
101*n* valve body annular groove
101*o* seal/O-ring
102 thread segment
103, 103" viewing window of the valve body
104, 104" valve chamber of the valve body
104*g* outside thread
104*k* clamping edge
104*s* collecting basin
104*t* seal edge
104*w*, 104*w*" wall of the valve chamber
105, 105" guide sleeve
105*a*, 105*a*" spring bearing of the guide sleeve
105*b*, 105*b*" spring stop of the guide sleeve
105*c*, 105*c*" thread region of the guide sleeve
105*d*, 105*d*" hollow-cylindrical region of the guide sleeve
106 bore of the guide sleeve
106*a* opening, tappet head side
106*b* opening, tappet tip side
106*d* borehole inside diameter/inside diameter of the bore
107,107" drainage bores
110 nozzle adjusting nut
110*a* nozzle adjusting nut opening
110g internal thread
111 nozzle/nozzle insert
111*a* nozzle opening
111*d* valve seat/sealing seat
120 restoring element/coil spring
150 sealing element/membrane seal
150*m* membrane seal, meander-shaped
150*f* membrane seal, flat
150*i* inner sleeve of the meander-shaped membrane seal
151 first sealing point
152 second sealing point
153 transition region/membrane
180 feed channel
200 metering system
211 fluidic unit/bayonet fluidic
212 valve support
220 actuator unit
221 actuator chamber
222 actuator
222*f* actuator spring
223 lever
223*k* contact surface
224 lever bearing
225 cylinder pins
226 guide cylinder
240 housing
250 heating device/heating module
251 heating connection
270 metering material storage holder
A head region of the valve tappet rod
B end of the valve tappet rod, face side
LA longitudinal axis of the valve tappet rod

The invention claimed is:

1. A valve tappet rod (1, 1") for a valve (100, 100") of a metering system (200) for a metering material,
   wherein the valve tappet rod (1, 1") has an elongate cylindrical body, the body comprising:
      a tappet tip (60) at a face-side end (B),
      a tappet head (10) at an opposite head region (A), and
      in sequential order from the tappet head (10) to the tappet tip (60), at least a first guide sleeve portion (20), a narrow portion (30), a second guide sleeve portion (40) and a fluidic portion (50),
   wherein an outside diameter (30*d*, 30*d*") of the narrow portion (30) is reduced in comparison with outside diameters (20*d*, 20*d*", 40*d*, 40*d*") of the guide sleeve portions (20, 40), and
   wherein a shoulder-like ledge (45) is disposed between the second guide sleeve portion (40) and the fluidic portion (50) so that an outside diameter (50*d*, 50*d*") of the fluidic portion (50) is smaller than the outside diameter (40*d*, 40*d*") of the second guide sleeve portion (40) in order to hold a sealing element (150*f*, 150*m*) in position to seal off the fluidic portion (50) with respect to a remaining region of the valve (100, 100").

2. The valve tappet rod according to claim 1, wherein the outside diameters (20*d*, 20*d*", 40*d*, 40*d*") of the guide sleeve portions (20, 40) are respectively equal in size and/or wherein the outside diameter (30*d*, 30*d*") of the narrow portion (30) is as large as an outside diameter (50*d*, 50*d*") of the fluidic portion (50).

3. The valve tappet rod according to claim 1, wherein the tappet head (10) has an actuating flange (11) for an actuator unit (220) of the metering system (200) and a guide ledge (13) for a centred guidance of a restoring element (120), wherein an outside diameter (13*d*, 13*d*") of the guide ledge (13) is greater than the outside diameter (20*d*, 20*d*") of the first guide sleeve portion (20) and an outside diameter (11*d*, 11*d*") of the actuating flange (11) in turn is greater than the outside diameter (13*d*, 13*d*") of the guide ledge (13).

4. The valve tappet rod according to claim 1, wherein a ledge (25) between the first guide sleeve portion (20) and the narrow portion (30) is formed to be steeper than a transition (35) between the narrow portion (30) and the second guide sleeve portion (40).

5. The valve tappet rod according to claim 1, wherein the ledge (45) is formed as a fillet (45) and the sealing element (150*f*), 150*m*) comprises a membrane seal (150*f*, 150*m*), wherein the fillet (45) has a fillet radius (45*r*) from 0.01 mm.

6. The valve tappet rod according to claim 1, wherein a tappet tip portion (55) adjoining the tappet tip (60) has a length (55*l*, 55*l*") from 0.25 mm to 10 mm, and/or wherein the tappet head (10) has a length (10*l*, 10*l*") from 0.25 mm to 10 mm, and/or wherein the first guide sleeve portion (20) has a length (20*l*, 20*l*") from 1 mm to 20 mm, and/or wherein the second guide sleeve portion (40) has a length (40*l*, 40*l*") from 1 mm to 20 mm, and/or wherein the narrow portion (30) has a length (30*l*, 30*l*") from 1 mm to 25 mm, and/or wherein a fluidic portion (50) has a length (50*l*, 50*l*") from 1 mm to 50 mm.

7. The valve tappet rod according to claim 1, wherein the tappet tip (60) has a radius (60*r*, 60*r*") from 0.1 mm to 0.8 mm, and/or wherein an actuating flange (11) of the tappet head (10) has an outside diameter (11*d*, 11*d*") from 3.2 mm to 10 mm and a guide ledge (13) of the tappet head (10) has an outside diameter (13*d*, 13*d*") from 1.75 mm to 9 mm, and/or wherein the first guide sleeve portion (20) has an outside diameter (20*d*, 20*d*") from 1.55 mm to 2.9 mm, and/or wherein the second guide sleeve portion (40) has an outside diameter (40*d*, 40*d*") from 1.55 mm to 2.9 mm, and/or wherein the narrow portion (30) has an outside diameter (30*d*, 30*d*") from 1 mm to 3 mm, and/or wherein a fluidic portion (50) has an outside diameter (50*d*, 50*d*") from 0.5 mm to 3 mm.

8. The valve (100, 100") for the metering system (200) for metering material with the valve tappet rod (1, 1") according to claim 1, wherein the valve (100, 100") comprises at least a hollow-cylindrical valve body (101, 101"), which encloses a guide sleeve (105, 105"), in which guide sleeve (105, 105") at least the guide sleeve portions (20, 40) remain partially, and the narrow portion (30) of the valve tappet rod (1, 1") entirely in an operation as intended, a restoring element (120) which is mounted between the tappet head (10) of the valve tappet rod (1, 1") and the guide sleeve (105, 105") for the valve tappet rod (1, 1"), a valve chamber (104, 104") to receive the metering material in a lower region on a side of the valve body (101, 101") facing away from the restoring element (120), a sealing element (150*f*, 150*m*) for sealing between the guide sleeve (105, 105") and the valve chamber (104, 104") of the valve body (10*l*, 10*l*").

9. The valve according to claim 8, with a conically tapering tappet tip portion (55) of the valve tappet rod (1), adjoining the tappet tip (60), between the tappet tip (60) and the fluidic portion (50), wherein a length (55*l*, 55*l*") of the tappet tip portion (55) for an associated nozzle (111) of the valve (100) varies according to a radius (60*r*, 60*r*") of the tappet tip (60), and/or wherein a length (55*l*, 55*l*") of the tappet tip portion (55) for an associate nozzle (111) is a maximum of 10 mm.

10. The valve according to claim 8, wherein the guide sleeve (105, 105") comprises metal matrix composite materials with hard material particles, and/or comprises at least two parts.

11. The metering system (200) with the valve (100, 100") according to claim 8 comprising a feed channel (180) for metering material, and an actuator unit (220) for actuation of the valve tappet rod (1, 1"), which directly or indirectly exerts a stroke onto the tappet head (10).

12. The metering system according to claim 10, wherein a length (20*l*, 20*l*", 40*l*, 40*l*") of a respective guide sleeve portion (20, 40) of the valve tappet rod (1, 1") corresponds at least to a stroke length of the valve tappet rod (1, 1").

13. The metering system according to claim 11, wherein the narrow portion (30) of the valve tappet rod (1, 1") is at least two maximum stroke lengths shorter than an associated guide sleeve (105) of a valve (100, 100").

14. The metering system (200) with the valve (100, 100") according to claim 11, comprising a metering material storage holder (270) for holding a metering material container, and/or wherein the actuator unit (220) for actuation of the valve tappet rod (1, 1") directly or indirectly exerts a stroke having a maximum stroke length of 1 mm onto the tappet head (10).

15. The valve (100, 100") for the metering system (200) for metering material with the valve tappet rod (1, 1") according to claim 8, wherein the restoring element (120) comprises a wound torsion spring (120).

16. The valve (100, 100") for the metering system (200) for metering material with the valve tappet rod (1, 1") according to claim 8, wherein the sealing element (150*f*, 150*m*) is formed as a meander-shaped membrane seal (150*m*) or a flat membrane seal (150*f*).

17. The valve tappet rod (1, 1") according to claim 1, wherein the narrow portion (30) is surrounded by the first and second guide sleeve portions (20, 40), and is a lubricant reservoir for automatic lubrication of the valve tappet rod (1, 1") during operation of the valve tappet rod (1, 1") on an ejection and retraction movement as intended.

18. The metering system (200) with the valve tappet rod (1, 1") according to claim 1, comprising a feed channel (180) for metering material, and an actuator unit (220) for actuation of the valve tappet rod (1, 1"), which directly or indirectly exerts a stroke onto the tappet head (10).

19. The metering system (200) with the valve tappet rod (1, 1") according to claim 18, comprising a metering material storage holder (270) for holding a metering material container, and/or wherein the actuator unit (220) for actuation of the valve tappet rod (1, 1") directly or indirectly exerts a stroke having a maximum stroke length of 1 mm onto the tappet head (10).

* * * * *